United States Patent [19]
Wulff

[11] 3,838,478
[45] Oct. 1, 1974

[54] GUTTING MACHINE FOR FISH

[75] Inventor: Hermann Wulff, Lubeck, Germany

[73] Assignee: Nordischer Maschinenbau Rud, Lubeck, Germany

[22] Filed: Jan. 28, 1971

[21] Appl. No.: 110,719

[30] Foreign Application Priority Data
May 22, 1970 Germany............................ 2024975
July 23, 1970 Germany............................ 2036538

[52] U.S. Cl............................. 17/59, 17/61, 17/63
[51] Int. Cl........................................... A22c 25/14
[58] Field of Search .............. 17/53, 54, 55, 56, 58, 17/59, 60, 61, 63

[56] References Cited
UNITED STATES PATENTS
| | | | |
|---|---|---|---|
| 998,129 | 7/1911 | Smith...................................... | 17/59 |
| 1,920,339 | 8/1933 | Baader.................................... | 17/61 |
| 3,123,853 | 3/1964 | Radloff et al........................... | 17/63 |
| 3,319,284 | 5/1967 | Schlichting ............................. | 17/63 |
| 3,399,422 | 9/1968 | Hartl...................................... | 17/56 |

*Primary Examiner*—Lucie H. Laudenslager
*Attorney, Agent, or Firm*—Edward F. Levy

[57] ABSTRACT

In a gutting machine for fish, wherein the gullet is cut the belly cavity is opened, the intestines are stripped and the head is severed by a circular cut, comprising a rotatably driven clip spider inclusing body clips formed by flank grippers opening symmetrically, a belly opener and intestine stripper pivotal in between the flank grippers of each body clip, a gullet and a neck cutter both arranged at one side of the body clips, the invention being characterized in that the clip spider is driven to rotate continuously about a vertical or inclined axis, and that each body clip includes a pair of flank grippers opening and closing symmetrically and a back support movable toward the vertical axis while the belly opener and the intestine stripper are pivotally mounted on a horizontal axis disposed outwardly of the path of movement of the body clips and tangentially thereto.

13 Claims, 8 Drawing Figures

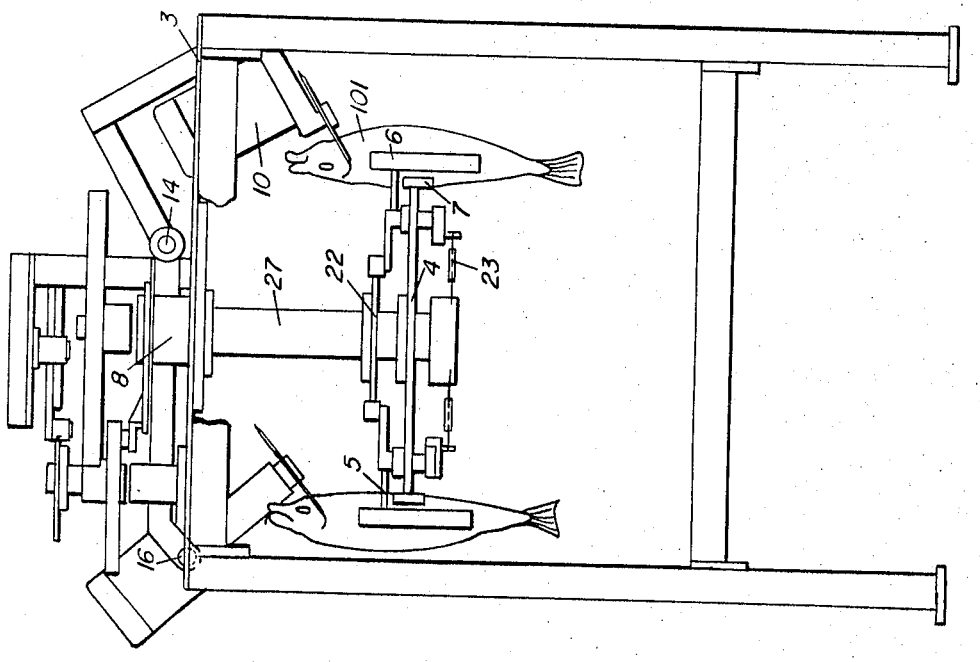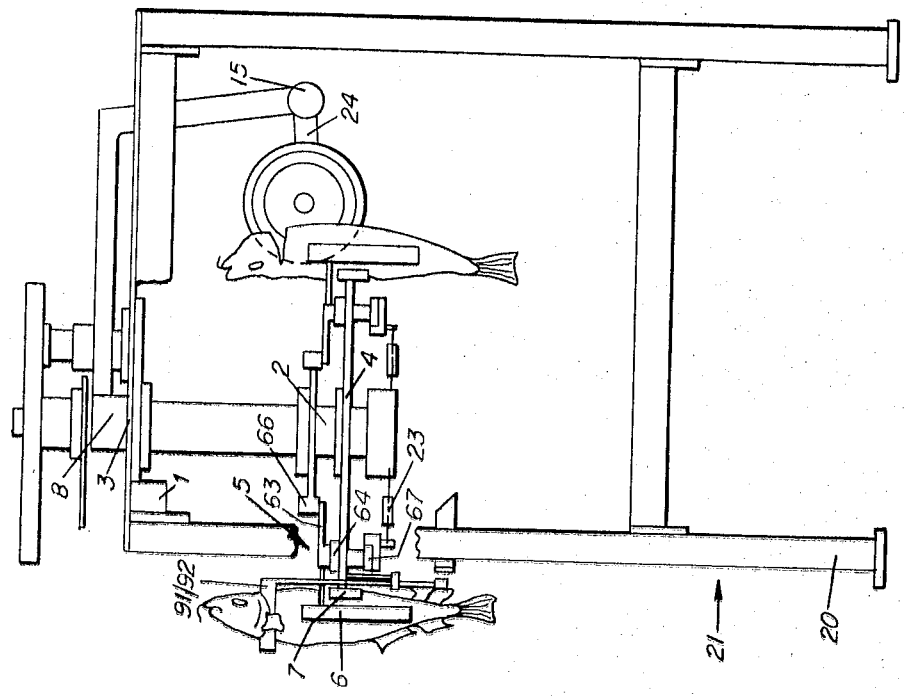

GUTTING MACHINE FOR FISH

BACKGROUND OF THE INVENTION

1. Field of Invention

The invention relates to gutting machines for fish as they are used in the fishing industry and on board of ships. In such machines it is important that the belly of the fish is cut open, the intestines are removed and the head is cut-off without waste of meat.

2. Description of the Prior Art

A fish gutting machine has been proposed for processing cod, haddock, sea salmon and sea bream, in which a rotor rotates intermittently about a horizontal axis and takes up fish by means of opening wing flaps so that the fish backs are disposed outwardly and their flanks are gripped by the wing flaps. While the rotor is indexed in steps of 45°, the throat is cut without damaging the gullet, the head is severed by a cut from the neck, and the head with the intestine and stomach and part of the entrails are pulled-out while the diaphragm is cut. The entrail residue is removed by successively applied rinsing with two nozzles, the alimentary tract being torn off on the return run of the second nozzle by means of teeth disposed on the lower part of the nozzle. The brushing system is reached with the fourth indexing motion of the rotor while the fifth indexing motion provides access to the apparatus for cutting open the belly flap and opening the bladder while the wing flaps, which are spread during the penultimate indexing motion of the rotor, eject the fish over the trough adjacent to the machine.

It is a disadvantage of this machine that centering of the fishes by means of the wing flaps is not uniform, both with respect to the position of their back bones as well as with regard to their planes of symmetry, the motion of the various tools being interrupted owing to the intermittent method of operation and accordingly both the output of the machine as well as the quality of the gutting operation are unsatisfactory.

Therefore it is a primary object of the invention to provide a continuously operating machine for gutting fish on board ship in a simple and rapid manner.

Summary of the Invention

In a gutting machine of the aforementioned type, comprising a rotatably driven clip spider including body clips formed by flank grippers opening symmetrical, a belly opener and intestine stripper pivotal in between the flank grippers of each body clip, a gullet and neck cutter, both arranged at one side of the body clips the invention is realized in that the spider is driven to rotate continuously about a vertical or inclined axis, and each body clip includes a pair of flank grippers and a back support movable relative to the axis of rotation of the clip spider in response to the opening and closing movement of the flank grippers, while the belly opener and the intestine stripper are pivotally mounted on a horizontal axis located outwardly of the path of movement of the body clips and tangentially thereto.

According to an especially advantageous embodiment of the invention fish guides including a pair of supporting edges for the roots of the pectoral fins are mounted on the clip spider above each body clip, which are coupled to spread symmetrically against the action of a spring, means for spreading the fish guides being provided at one location of the rotating clip spider.

According to another appropriate construction of the subject matter of this invention at least one of the tools is rotatable about the axis of the clip spider in the rotating direction thereof and actuated by control means in such a manner that, while it is pivotally moved toward the axis of rotation and away therefrom is guided synchronously in unison with a body clip and is returned to its initial position at the end of its pivoting movement.

The advantages achieved by the invention are particularly to be seen in the fact, that *a.* the gullet machine may be loaded with fish in a simple manner by placing them between the fish guides while the clip spider is rotating, *b.* the closing of the body clips can take place over a section of the circular path of the clip spider, whereby an unobjectional orientation and safe gripping of fishes of all sizes to be processed is assured, *c.* all fishes are oriented with their lower edge of the backbone in equal positions and with the roots of their pectoral fins resting on the upper edges of the flank grippers, *d.* due to the upwardly pivoting movement of the belly opener and intestine stripper, the collar bones are tensioned due to the displacement of the alimentary tract against the diaphragm of the fish, whereby the exact slitting of the belly between the collar bones is achieved, and *e.* a careful processing of the fish, even at high capacity, is assured due to the rotation of the tools in unison with the body clips during the pivotal, i.e., the processing step.

Further objects, features and advantages of the invention will become evident from the following description of an exemplified embodiment of the invention in connection with the attached drawings.

BRIEF DESCRIPTION OF THE DRAWINGS

FIG. 1 is a front view of the gullet machine according to the invention with the casing removed, FIG. 2 is a side view of the machine shown in FIG. 1 with the casing removed.

DESCRIPTION OF THE PREFERRED EMBODIMENT

Figure 3:
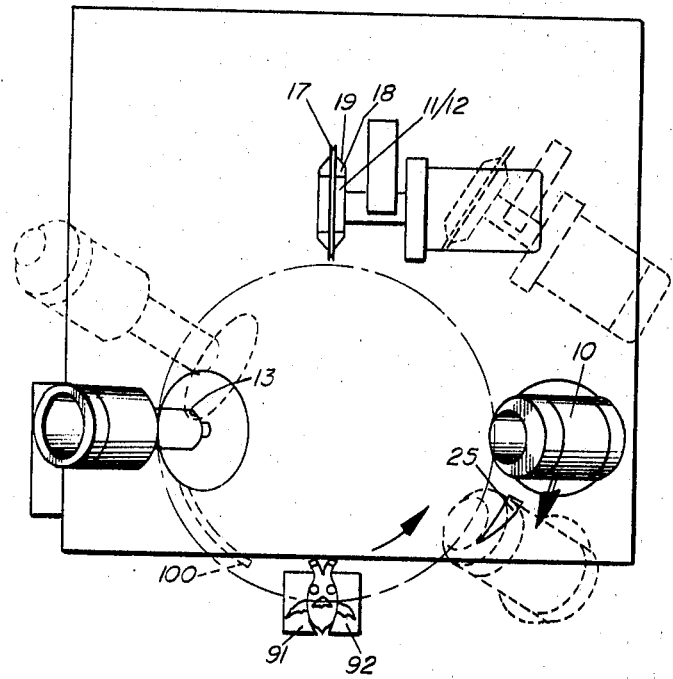
FIG. 3 is a top view of the tools of the machine.

The machine has a frame 1 comprising four supporting posts or corner columns 20 with a supporting plate 3 mounted thereon which in turn supports a shaft 2, rotatably journalled in a bearing flange 27. A clip spider 4 is mounted on the shaft 2 below the bearing flange 27 and is arranged to be continuously driveable in a suitable manner. The shaft 2 is shifted toward the side of loading. The clip spider carries radially arranged body clips 5 at its lower end, each comprising a pair of symmetrically opening flank grippers 6 and a shiftable back support 7, coupled with the flank grippers in such a way that it will shift toward the shaft 2 as the distance between the flank grippers increases. The opening and closing movement of the body clips is controlled by a cam 22 fixed to the lower end of the bearing flange 27 and achieved by springs 23. The inner sides of the flank grippers may be provided with sharp points or spikes for safely retaining the fish. The upper edges of the flank grippers may be bent inwardly for gripping behind the pectoral fins and the clavicle to center the fish.

Figure 4:
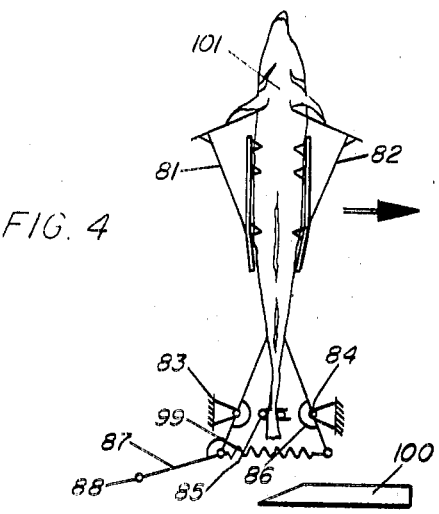
FIG. 4 is a view of the body clips and the fish guides.

Above each of the flank grippers 6 a pair of left hand and right hand fish guides 91 and 92 respectively is arranged provided with supporting edges 93 and 94 respectively. As shown in FIG. 4 the fish guides 91, 92 are supported by left hand and right hand connecting links 81 and 82 respectively, engaging the clip spider 4 at their sides facing the same and forming a rigid unit with the fish guides 91, 92. The lower ends of the connecting links 81, 82 are pivotally mounted on stationary axii 83, 84 and are crossing each other, wherein the connecting link 81 pivots about the axis 84 and the connecting link 82 about the axis 83. The connecting link 81 carries a synchronizing lever arm 86 and the connecting link 82 a synchronizing lever arm 85 which are coupled together. In addition a tension spring 99 is arranged between the connecting links 81, 82 in such a manner that the fish guides 91, 92 are pretensioned to be positioned at the smallest possible space between them. Besides this the connecting link 82 carries a cam follower lever 87 engaging a cam 100 fixed to the frame 1.

Figure 5:
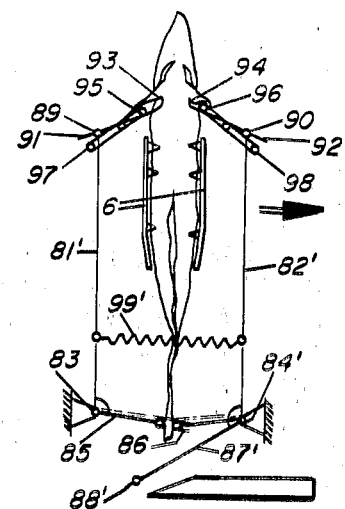
FIG. 5 is a somewhat altered embodiment of the body clips shown in FIG. 4.
Figure 6:
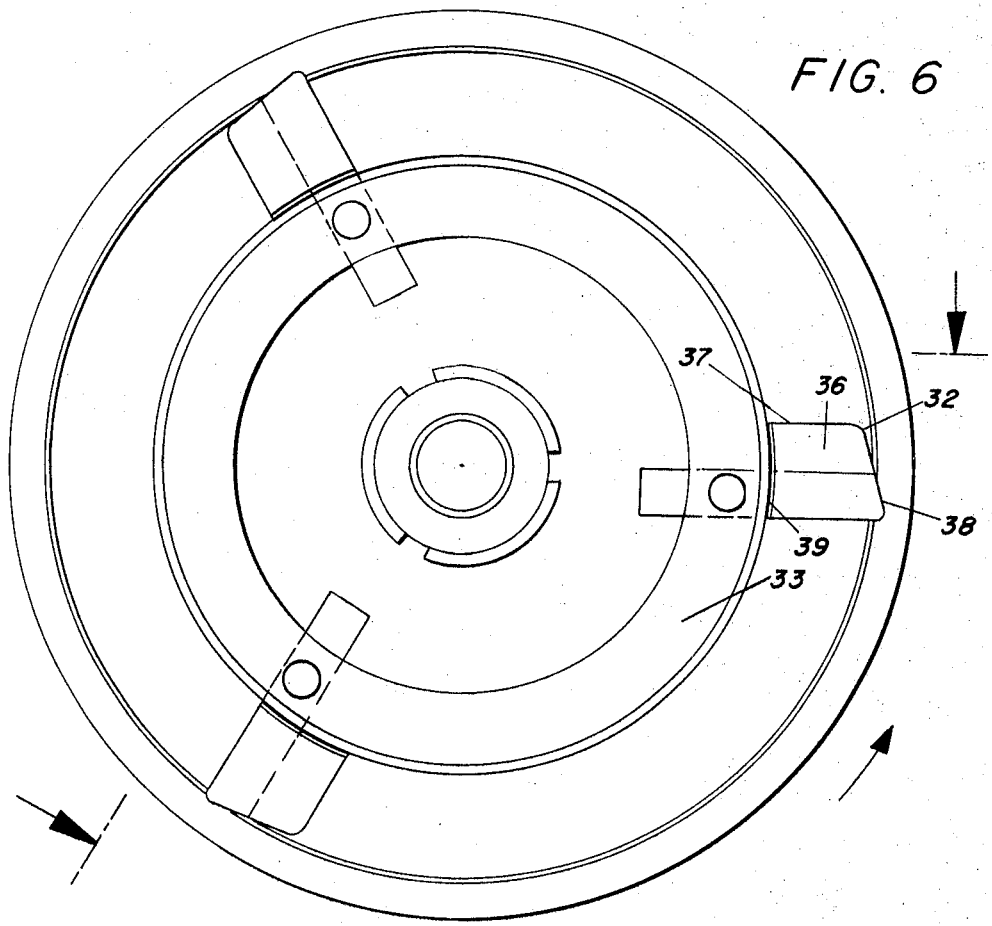
FIG. 6 is a top plan view of the belly opener.

FIG. 5 shows a somewhat different construction wherein the connecting links 81' and 82' extend parallel to each other and are joined between their ends by the spring 99'. The parts 83', 84', 87' and 88' correspond to the parts 83, 84, 87 and 88 shown in FIG. 4 and described above.

The supporting plate 3 is provided with cut-out portions allowing the movements of the tools, and above these cut-out positions a tool carrier 8 is journalled to rotate with the shaft 2. Also drive and control means for synchronously rotating the tool carrier 8 with the clip spider 4 are arranged above the supporting plate 3. Below the supporting plate 3 the tool carrier 8 carries a pivot arm 24 on a shaft 15 with a combined tool, comprising a belly opener 11 and an intestine stripper 12. Above the supporting plate 3 a gullet cutter 10 and a neck cutter 13 are pivotally mounted to the tool carrier 8 by shafts 14 and 16 respectively. For controlling the movements of the belly opener, the gullet cutter and the neck cutter cams fixed to the supporting plate 3 in a well known, not illustrated manner may be used. Guides may be provided between the tools. A guide adapted to open the gill cavity is shown at 25.

Figures 7, 8:
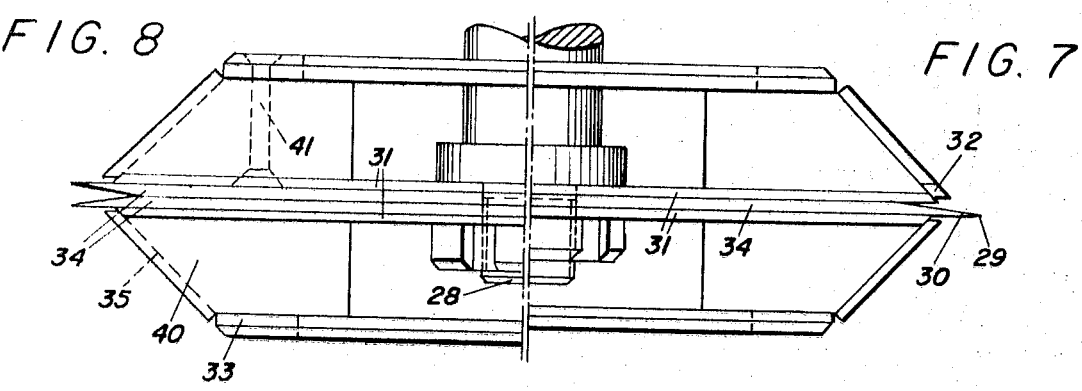
FIG. 7 is a side view of the belly opener.
FIG. 8 is a side view of a somewhat different belly opener.

The circular belly slitting knife 34 is provided with a chamfer 30 on one side, the circumference of the knife having a cutting edge 32. A support plate 31 bears on each side on the lateral surfaces of the circular knife 34, each of said supporting plates 31 being adapted to join, by means of three retaining members 40, three beater knives 35 through projections disposed thereon to a ring 33 on each side. In the illustrated example the beater knives 35 and the ring 33 are bolted on to the supporting plate 31 or joined thereto by rivets 41. The two belly cavity cleaners, comprising supporting plate 31, beater knives 35 and rings 33 are bolted, with the belly slitter disposed therebetween, on to a shaft 28 by means of a nut. Blades 36 of the beater knives 35 rest on and are welded to declined outer surfaces of the retaining members 40, which are made of stainless flat steel, and project therefrom in the direction of rotation. The circumferential cutting edges 38 of the beater knives abut with their rear edges 39 against the supporting plate 31, while the edges disposed at their radial cutting edges 37 are spaced a few millimeters therefrom. In this manner a wedge-shaped slot 32 is formed between the circumferential cutting edges 38 and the circumference of the supporting plate 31. If required, the belly slitter may comprise two circular knives instead of one contacting each other with their chamfers, as shown in FIG. 8. The beater knives 35 are arranged in such a manner that their circumferential cutting edges 38 are disposed on a radius, which is at least 5 mm smaller than the radius of the cutting edge 29 of the belly slitter 11.

FIG. 3 illustrates the cooperation of the clip 5 with the flank grippers 6 and the back support 7. The clip spider 4 carries levers 61, 62 which are swingable about axles 64, 65 and which carry the two flank grippers 6. These levers are synchronized by tooth segments located under the clip spider 4 and are pressed together by the spring 23 (as also shown in FIG. 1). One lever 62 is extended beyond its bearing at the axle 64 by a lever 63 which carries at its free end a roller 66. This roller is engaged by the cam 22 (FIG. 1), thereby causing the opening of the flank grippers 6.

The method of operation of the gutting machine is as follows:

A fish gripped by hand at its head is inserted with its back between the guides 91, 92 of the opened body clips 5 and is urged downwardly, so that the roots of its pectoral fins rest on the supporting edges 93, 94. For inserting the fish the body clips 5 are opened sufficiently that the greatest fish may be inserted. Upon further rotation of the clip spider 4 the fish is moved by the closing body clips 5 into a position in which its inner surface of the belly cavity is disposed on a defined radius relative to the shaft 2. In this position it is symmetrically gripped and clamped by the flank grippers 6. After closing of the body clip, the fish is located and aligned therein so that, independent of its size, the lower edge of its back bone is disposed at a certain radius relative to the axis of rotation of the clip spider 4. As customary the throat of the fish has already been cut so that, when the body clip 4 rotates, the fixed throat guide 25 penetrates into the opened gill cavity of the fish to enable the fish to be transferred to the gullet cutter 10. When the body clip with the fish has reached the gullet cutter, the gullet cutter commences to co-rotate with the body clip 4 in the anti-clockwise direction, while at the same time pivoting its rotating gullet cutting knife into the fish. By virtue of the clearly defined position of the fish in the body clip this operation is accompanied by cutting through the gullet without the gullet knife cutting into the vertebra of the backbone. After the gullet is cut, the gullet cutter has emerged from the throat of the fish and, rotating in the closkwise direction, returns to its starting position. Together with the gullet cutter 10 also the other tools have returned to their initial positions so that the body clip 5 finds the belly opener 11 in its starting position. The belly opener now co-rotates with the body clip and pivots from below into the fish, cutting it open in a direction from the end of the belly cavity upwardly. During the pivoting movement through the belly cavity of the fish the beater knives 18 of the intestine stripper 12, which is combined with the belly opener 11, cause, due to their rotation in the direction of pivoting, so to speak a hydraulic pressure in the belly cavity of the fish, by means of which it is tensioned allowing the circular knives 17 to slit the belly cavity centrally up to between the collar bones. After the slitting operation is finished the stripping of the intestine, including the gullet, the stomach, the intestines, the liver, and the ovaries, which have been torn loose by the beater knives 35 takes place. By virtue of the following rinsing with water the remains of the intestines are removed out of the belly cavity. By means of the neck cutter 13, also co-rotating with the body clips 5, the head of the fish may be severed in such a way that the fish is adapted to be processed to dried cod.

After passing the processing tools the discharge station in front of the loading station is reached, where the body clips 5 are opened and also the fish guides 91, 92 are spread by the cam 100, whereby the gutted fish is released.

According to the embodiment shown in FIG. 3 the connecting links 81, 82 pivotally suspended by the axii 83, 84 from the clip spider 4, extend substantially in parallel relation to each other and carry the fish guides 91, 92 by pivots 89, 90 at the upper ends. The free ends of the fish guides 91, 92 are guided adjacent their supporting edges 93, 94 by control rolls 95, 96 in roof-like declined guide ways fixed to the spider clip 4. The mode of operation corresponds to that described before already. However, the operation may be further summarized as follows:

During the rotation of the clip spider 4 the roller 66 is pushed outwardly by the fixed cam 22 and it swings counterclockwise the lever 63 and with it the lever 62.

Thus the flank grippers 6 are moved to their largest distance from each other. When after the hanging of the fish 101 upon the fish guides 91, 92 (FIG. 5) the roller 66 moves away from the cam 22 the two flank grippers 6 will move toward each other due to the action of the spring 23 and at the same time the back support 7 is shifted between the flank grippers 6. Then the back support 7 will engage the back of the fish and will push it outwardly until the flank supports come into engagement with the flanks of the fish and stop its further movement.

After the clip 5 and with it the pair of fish guides 91, 92 have passed the last tool of the machine, namely, the neck cutter 13, the roller 88 located upon the free end of the lever 87 will run upon the inclined inlet cam 102 (FIG. 5) of the fixed cam 100. Then the lever 87 and with it the guide 82 are swung clockwise, while at the same time the guide 81 is swung counterclockwise by the synchronous levers 85, 86. Thus the fish guides 91, 92 are moved away from each other and free the fish which will then drop and leave the machine.

What is claimed:

1. A gutting machine for fish, severing the gullet, opening the belly cavity, stripping the intestine and severing the head by a circular cut, the machine comprising in combination:
    a. a clip spider (4) arranged on a shaft (2);
    b. drive means rotating said clip spider continuously;
    c. belly clips (5) arranged on said clip spider each including a pair of flank grippers (6) interconnected by means (85,86) so as to open and close symmetrically and a back support (7) movable toward and away from said shaft;
    d. means driveably interconnecting said clips with said back support moving the latter toward said shaft as the distance between said flank grippers increases; and
    e. a second shaft, a combined belly opener and intestine stripper (11,12) pivotal upwardly through the space between said clips about said second shaft (15) disposed outwardly of the circular path of movement of said clips and tangentially thereto.

2. A gutting machine as claimed in claim 1, wherein a pair of fish guides (91,92) are provided one arranged above each clip and including supporting edges (93,94) engaging the roots of the pectoral fins of the fish said fish guides being coupled to spread symmetrically against the action of a spring (99), means (100) for spreading said fish guides being provided at one location of the circular path of said clip spider.

3. A gutting machine as claimed in claim 2, wherein each supporting edge (93,94) is guided along an inclined path whereby the distance between them increases as they are moved downwardly.

4. A gutting machine as claimed in claim 3, having synchronously coupled guide rods and two gideways wherein said fish guides (91,92) carrying said supporting edges (93,94) are pivotally connected to the upper ends of said synchronously coupled guide rods (81,82) and are guided adjacent said supporting edges in said two guideways (97,98) said two guideways being arranged symmetrically and sloping downwardly and outwardly relative to the middle of symmetry.

5. A gutting machine as claimed in claim 1, wherein said belly opener (11) and said intestine stripper (12) are connected to a rotating tool said belly opener including at least one circular knife (34) having an inner circumferential chamfer (30) to form an outwardly disposed cutting edge (29) while said intestine stripper is formed by beater knives (35) one arranged at either side of said belly opener and each including blades (36) having circumferential cutting edges (38) extending along the generated surface of a frusto cone having a greatest diameter which is smaller than the diameter of the cutting edge (29) of said belly opener.

6. A gutting machine as claimed in claim 5, wherein said belly opener (11) is formed by a pair of circular knives (34) having facing chamfered edges (30) disposed at the inner sides.

7. A gutting machine as claimed in claim 5, wherein the blades (36) of said beater knives (35) include edges (39) secured to a ring (33) one being disposed at either side of said belly opener (11).

8. A gutting machine as claimed in claim 7, wherein said beater knives (35) and said ring (33) are secured to a circular supporting plate (31) forming a unit therewith.

9. A gutting machine as claimed in claim 1, wherein said belly opener (11) and said intestine stripper (12) are connected to a rotary tool said belly opener including at least one circular knife (34) having an inner circumferential chamfer (30) to form an outwardly disposed cutting edge (29) while said intestine stripper is formed by beater knives (35) one arranged at either side of said belly opener and each including blades (36) secured between an outer ring (33) and an inner supporting plate (31) forming a unit mounted on a rotatably driven shaft (28), said blades having circumferential cutting edges (38) extending along the generated surface of a frustocone having a greatest diameter which is smaller than the diameter of the cutting edge (29) of said belly opener wherein tapering slots (32)

are formed between said circumferential cutting edges of the beater knife blades (36) and the associated supporting plate (31).

10. A gutting machine as claimed in claim 1, wherein a gullet cutter (10) is arranged in front of said belly opener (11) pivotally supported on a shaft (14) disposed inside of the path of movement of and above said clips (5).

11. A gutting machine as claimed in claim 1, wherein a neck cutter (13) is pivotally arranged behind said intestine stripper (12) inside of the path of movement of and above said clips (5).

12. A gutting machine as claimed in claim 1, wherein a gullet cutter (10) is arranged in front of said belly opener (11) pivotally supported on a shaft (14) disposed inside of the path of movement of and above said clips (5) and a neck cutter (13) pivotally arranged behind said intestine stripper (12) inside of the path of movement of and above said clips (5) and wherein at least one of said tools, said gullet cutter (10), said belly opener (11), said intestine stripper (12) and said neck cutter (13) is arranged to rotate about said vertical shaft (2) equidirectionally with said clip spider (4) and is actuated by control means in such a manner that during its pivoting movement it is moved synchronuously with a clip (5) in a direction toward and away from said vertical shaft (2) and is returned at the end of its pivoting movement to its initial position.

13. A gutting machine as claimed in claim 12, wherein said gullet cutter (10) and said neck cutter (13) are arranged closely above the upper edges of said clips (5) said edges forming supports for the pectoral fins of the fish.

\* \* \* \* \*